United States Patent [19]

Jones

[11] Patent Number: 4,835,697

[45] Date of Patent: May 30, 1989

[54] COMBINATION GENERATOR FOR AN ELECTRONIC POSTAGE METER

[75] Inventor: Howell A. Jones, Southport, Conn.

[73] Assignee: Pitney Bowes Inc., Stamford, Conn.

[21] Appl. No.: 595,771

[22] Filed: Apr. 2, 1984

[51] Int. Cl.⁴ .................................................. G06F 1/00

[52] U.S. Cl. ................................. 364/464.02; 364/900

[58] Field of Search .................. 364/464, 900; 380/23, 380/25, 49; 235/379–382

[56] References Cited

U.S. PATENT DOCUMENTS

| | | | |
|---|---|---|---|
| 4,097,923 | 6/1978 | Eckert, Jr. et al. | 364/900 |
| 4,310,720 | 1/1982 | Check, Jr. | 380/49 X |
| 4,376,299 | 3/1983 | Rivest | 364/900 |
| 4,408,203 | 10/1983 | Campbell | 235/382 X |
| 4,423,287 | 12/1983 | Zeidler | 235/382 X |
| 4,509,141 | 4/1985 | Soderberg et al. | 364/464 X |
| 4,629,871 | 12/1986 | Scribner et al. | 235/375 |
| 4,630,201 | 12/1986 | White | 235/380 X |
| 4,634,808 | 1/1987 | Moerder | 380/45 X |
| 4,683,968 | 8/1987 | Appelbaum et al. | 380/25 X |
| 4,723,284 | 2/1988 | Munck et al. | 380/23 X |

*Primary Examiner*—Parshotam S. Lall
*Assistant Examiner*—Joseph L. Dixon
*Attorney, Agent, or Firm*—Michael J. DeSha; David E. Pitchenik; Melvin J. Scolnick

[57] ABSTRACT

Apparatus in a microcomputerized postage meter internally generates a finite set of combination of numbers having a specifiable number of digits in each combination. The combinations are used to allow for the addition and removal of postal funds within the meter. The apparatus utilizes a modification of common coding schemes to implement the generation of the combinations. The modification provides for the generation of an intermediate combination of numbers from a seed table located within the postage meter. The modification thereafter provides for the generation of the internally generated combinations from the intermediate combination. Thus, the internally generated combination is generated by using existing code. By use of this modification, less memory capacity is necessary to store combinations than with previous combination generation schemes, thereby allowing for that capacity to be used for other functions within the postage meter.

7 Claims, 5 Drawing Sheets

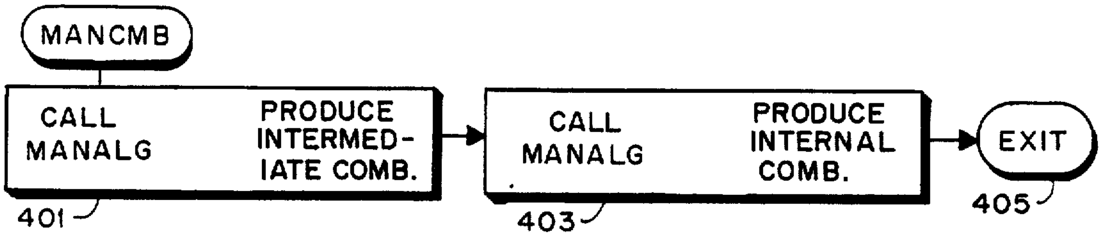
FIG. 7
FIG. 8
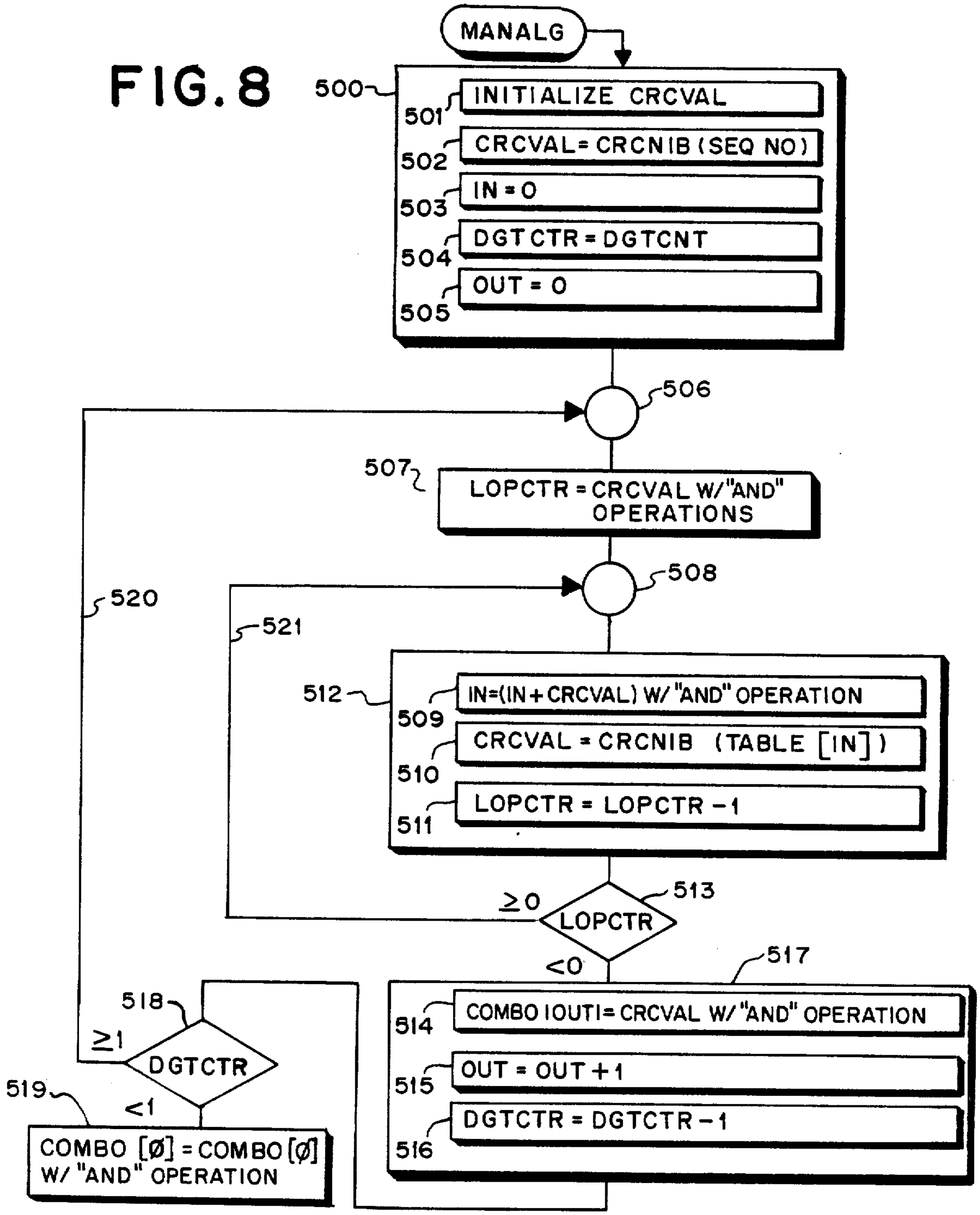

COMBINATION GENERATOR FOR AN ELECTRONIC POSTAGE METER

FIELD OF THE INVENTION

This invention relates to security systems and more particularly to the security systems associated with electronic postage meters.

BACKGROUND OF THE INVENTION

It is important in postage meters that the meter be physically secure from intrusion. As is well known, postage meters can be recharged; that is, additional value can be added to them in a variety of ways. For example, the postage meter can be physically taken down to a Post Office where the Post Office personnel will physically add incremental amounts of value to the meter or remove funds from the meter. Often times, the meter will have a external lock of a mechanical variety that is opened by a key. In addition, postage meters of this type have a combination associated therewith to allow for additional funds to be added to the meter. The combination adds additional security to the postage meter and prevents unauthorized personnel gaining access thereto.

It is important in this kind of system that the security be enhanced and thereby have a combination associated therewith in which only the authorized user can gain access. There are several existing methods for securing these kinds of meters from unauthorized personnel. These methods are generally effective but it is important to continue to develop new and better ways for securing the meters.

Often times, the Post Office will want to have the ability to change the combination generated by a microprocessor or the like to prevent unauthorized access to the postage meter. This capability is important in as much as personnel within the Post Office ma change thereby in certain circumstance, making it desirable to change the new combination necessary to unlock the postage meter. The ability to change the combination is important also because, since as is well known, postage meters are often leased to customers, the customers should not have the ability to open the meter at any time even if they somehow gained access thereto.

It is well known that schemes are used in a hotel to periodically change the locks. For example, if a customer uses the key to a hotel room and then inadvertently or purposely takes the key upon checking out of the hotel, there are schemes which will allow the hotel manager to give the next customer a new key thereby changing the lock or combination of the lock and allowing the new owner or the new customer access to the room. At the same time, the old key taken by the previous customer will no longer open the door. As before mentioned, this scheme is used to prevent unauthorized personnel from gaining access thereto. For hotel lock systems, there should be a set of combinations generated for implementation of the above-mentioned scheme. This can be accomplished in a variety of ways.

Similarly, in a postage meter, a desirable system should be provided that can perform a function very similar to that performed in the above-mentioned hotel system; that is, providing a set of combinations that will in a sequential manner provide access to the postage meter after using a physical key.

Thus, it is important in a manual recharging type postage meter to have means for generating a set of combinations in a simple and efficient manner to allow for enhanced security. At the same time, these combinations should desirably be generated in a random-like fashion so that it will not be easy to recreate the combination and thereby enter the locked postage meter.

A postage meter which uses series of combinations to unlock the meter for funding is disclosed in U.S. Pat. No. 4,097,923 in the names of Alton B. Eckert, Jr., Howell A. Jones, Jr. and Frank T. Check, Jr., assigned to the assignee of this patent application. In Eckert et al, there is disclosed a remote postage meter charging system using an advanced microcomputerized postage meter. This system is built around a microcomputer set and the meter contains seed numbers for generating postage funding combinations. The remote postage meter charging system has the capability of adding variable amounts of postage into the postage meter.

Another type of postage meter that will need a combination of numbers generated for it is a microcomputerized postage meter that does not have remote postage charging; that is, a postage meter that has a microcomputer within it that it also is physically under a mechanical lock and key. In addition to the mechanical lock, a series of numbers must be entered into the postage meter must be entered to open the postage meter to allow funding. This type of postage meter as before mentioned has to either be taken physically down to the Post Office or personnel must visit the customer's premises to allow the additional funding to take place.

Thus, it is important that in this kind of meter that an individual who has the key to the mechanical lock also has the combination to add the funding to the meter. In manually recharged kinds of meters that are physically carried to the Post Office or where authorized Post Office personnel comes to customer's business, again a combination is internally generated to unlock the meter.

Also, in postage meters of this type, the meter's combination should be secure to prevent unauthorized entry into the postage meter. Heretofore, there have been methods and apparatuses for generating a series of combination of numbers within the postage meter. Prior systems have provided adequate security and have operated satisfactorily. However, often times, the apparatus utilized in postage meters, such as those used in remote recharging postage meters to generate the combinations, are complex and expensive. In addition, these schemes often times require the use of valuable memory space in the postage meter. Thus, what is desired is a way of internally generating series of combinations in a microcomputerized postage meter that will allow for a random or pseudo random pattern and also reduce the amount of valuable memory space used in the microprocessor that heretofore has been necessary.

SUMMARY OF THE INVENTION

Apparatus provide a series of combinations of numbers for an electronic lock system for an electronic postage meter. These combinations will provide a postage meter with a series of numbers that can be utilized to add or remove postage funds within the meter. More particularly, without the proper combination of numbers, the unauthorized personnel cannot gain access to the postage to add funding thereto.

This apparatus is used advantageously in a microprocessor based postage meter. In this system, the postage meter responds to a set of numbers to unlock the device to prevent unauthorized entry to the postage meter. Stored within the postage meter are a seed and a program which produce a finite series of combinations. The number of digits in each combination is specified by a number stored in the meter which may vary from meter to meter. The combinations produced by the postage meter are utilized in such a manner that the meter responds to two combinations, the primary and the secondary combination, until such time that the last combination in the finite series of combinations has become the primary combination and no secondary combination exists. The primary combination may be used as often as desired without causing a change in the primary or secondary combinations. Use of the secondary combination, in addition to allowing access, causes the secondary combination to become the primary combination and causes the next combination in the series, if one exists, to become the secondary combination.

In accordance with one embodiment of the invention, an apparatus is disclosed that will internally generate a finite number of combinations. This apparatus comprises means for generating a sequence of a specifiable number of digits forming a combination, that combination being dependent upon the combination sequence number, the number of digits specified for the combination and a table of seed numbers in the memory location of the microprocessor. This apparatus includes a routine using the above-mentioned functions to generate an intermediate combination from the seed table which is equal in size to the seed table. Thereafter the same routine is utilized with the intermediate combination instead of the seed table to generate a combination with the specified number of digits that is to be used to unlock the postage meter.

In accordance with this embodiment, a routine already existing in the meter which generates a cyclical redundancy code (CRC) is used as part of the routine to generate the combination. The CRC values generated are used by other routines to provide a finite number of combinations. This apparatus saves valuable memory space, in the microprocessor because the tables are generated through calculation rather than being part of the overall memory of the system thereby allowing for memory space to be used for other purposes. These combinations can thereafter be used sequentially to provide the numbers for unlocking microprocessor based electronic postage meters and the like. This apparatus is a simple way to generate a finite number of combinations for a microprocessor based postage meter while using an existing coding scheme.

BRIEF DESCRIPTION OF THE DRAWINGS

FIG. 7 is a flow chart of a subroutine MANCMB which, is associated with the subroutine generalized flow chart of FIG. 6.

FIG. 8 is a flow chart of a subroutine MANALG which is associated with the subroutine flow chart of FIG. 7.

DETAILED DESCRIPTION OF THE DRAWING

Figure 1:
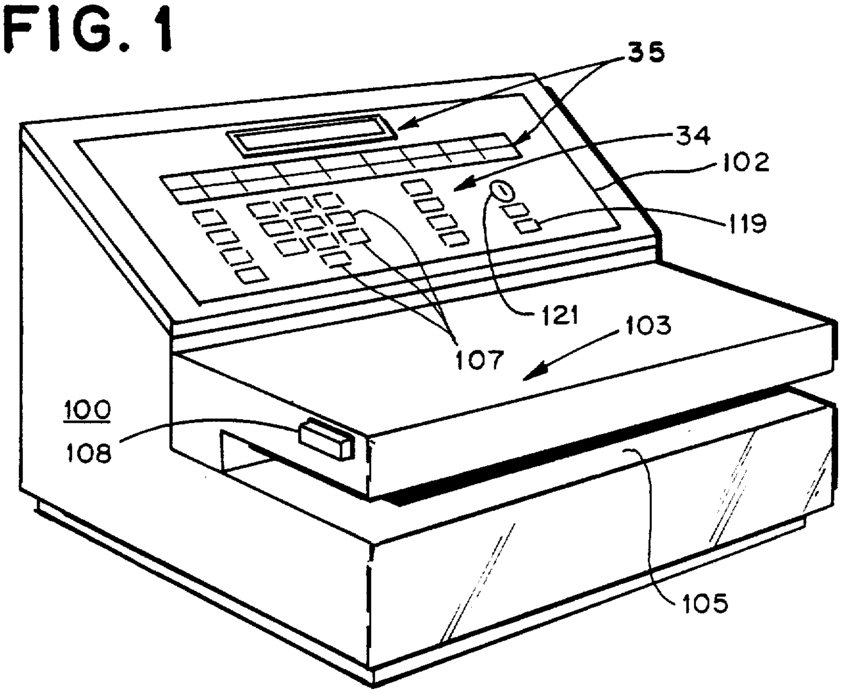
FIG. 1 is a perspective view of a microcomputerized postage meter.

FIG. 1 shows a perspective view of a microcomputerized postage meter of this invention. As will be described in further detail hereinafter, a postage meter 100 has a keyboard 34 for entering data into and controlling the operation of the meter. Postage is funded into the meter 100 by opening the base of the meter 100 via a key (not shown). The Post Office personnel provides the identifying number of the meter 100 to be funded. The last readings of the ascending and descending registers of the meter 100 and the amount of postage which is desired to be entered into the meter 100 are noted. The Post Office personnel then unlocks the meter 100, keys in the desired postage on the keyboard 34 and enters the combination. The meter 100 contains an apparatus which then generates an internal combination.

The meter 100 is recharged with the previously keyed in postage amount if the combination entered is in agreement with the internally generated combination. The apparatus which generates this combination will be described in greater detail hereinafter.

Figure 2:
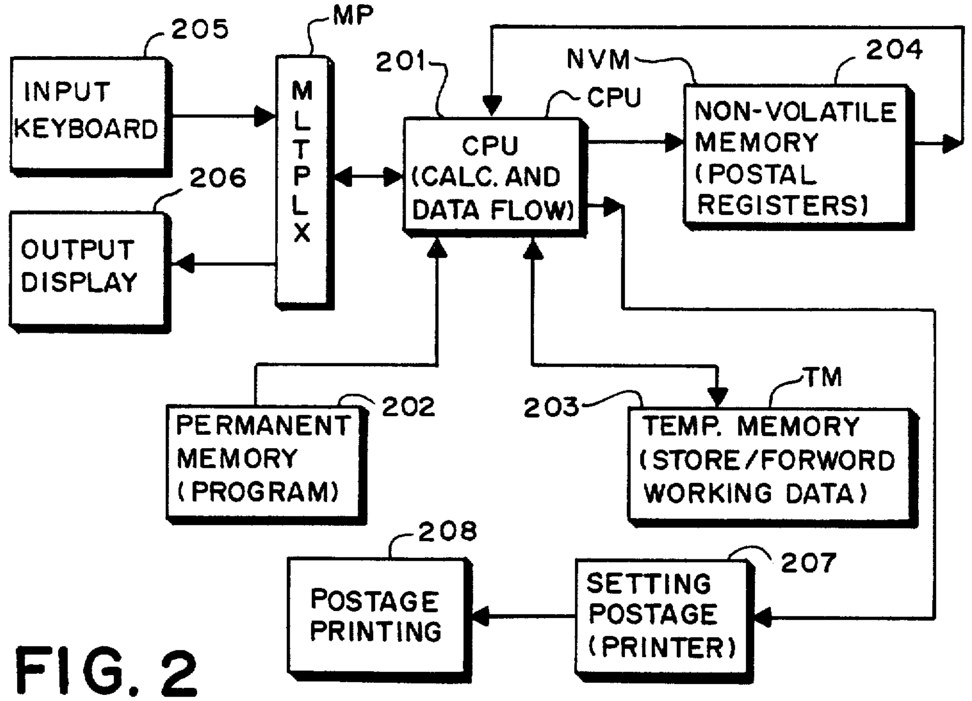
FIG. 2 shows in block diagram form the interaction of the electronic circuitry within the postage meter.

Referring to FIG. 2, the general functional arrangement of the microcomputerized postal meter 100 of the present invention is shown. The heart of the system is a central processing unit CPU 201 and it performs two basic functions: performance of calculations based on input data and controlling the flow of data between various memory units. Three basic memory units are employed by CPU 201. The first is the permanent memory (PM) 202 which is a non-alterable memory storing a specific sequence of operations for performing postal data calculations in occurrence with certain predetermined inputs as well as performing other routines for operating the system. A second memory unit is a temporary memory TM 203 which interacts with the CPU 201 for forming a temporary storage holding and forwarding working data in accordance with the calculation being performed by the CPU 201. An additional memory component NVM 204 is also coupled to the CPU 201 and performs a storage function which is very significant in this system's operation of a postal data system. The NVM 204 is a non-volatile memory which acts to store certain critical information employed in the postal system as part of a predetermined routine activated either upon shut-down or start-up. The NVM 204 contains variable data that must be preserved in the event of the loss of electrical power.

A routine located in the permanent memory PM 202 is accessed by an appropriate sensing device for sensing either of two steady conditions (shut-down or start-up) for operating the CPU 201 in accordance with that routine. The function of this routine is to take information stored in the temporary memory 203 which represents the result of crucial accounting functions such as descending balances or extending credits and the like and store them in the NVM 204 where they may be held while the machine is de-energized and recalled upon subsequent start-up. In this manner, the computer system may continually act upon the balances in temporary memory without fear of loss of this information upon shut-down.

Further, the information may be recalled on reactivation by start-up by retrieving it from the non-volatile memory 204 and feeding it back into the TM 203 via the CPU 201. The non-volatile memory 204 is shown as coupled to CPU 201 and deriving an output therefrom in accordance with the transfer of information from the temporary memory 203 under the control of the permanent memory 202 through the CPU 201 in accordance with the shut-down routine.

The NVM 204 is also shown as providing an output line coupled back into the CPU 201 for transferring the data back into and through the CPU 201 and into the temporary memory 203 in accordance with the start-up routine under the control of the permanent memory 202. The system operates in accordance with data applied from an appropriate input means I 205. This data is fed into the CPU 201 under control of the program in the permanent memory.

At any time during the operation of the system should the contents of the temporary memory 203 storing the appropriate credit, debit, balances or other accumulations in accordance with the various features of this system be desired to be displayed, appropriate instruction provided by the input means 205 causes the CPU 201 to access the desired location TM 203 storing the information requested. The information is provided through the CPU 201 into the output display O 206. The input 205 and output 206 units may be multiplexed by a multiplex unit MP to and from the CPU 201.

Under control of the CPU 201, when appropriate postal data information is provided from the input 205 and all the conditions such as limits and the like which may be preset in accordance with the entered data and storage in the temporary memory 203 are satisfied, a postage setting device SP 207 will respond to an appropriate output signal from the CPU 201 enabling a postal printing unit PP 208. At this point, the system now has accomplished its immediate function of setting the postage printer enabling the printer to print postage. The foregoing functional description of the present meter and its embodiment is described in full detail in U.S. Pat. No. 4,097,923 issued on June 27, 1978 in the names of Alton B. Eckert, Jr., Howell A Jones, Jr. and Frank T. Check, Jr.

Figure 3:
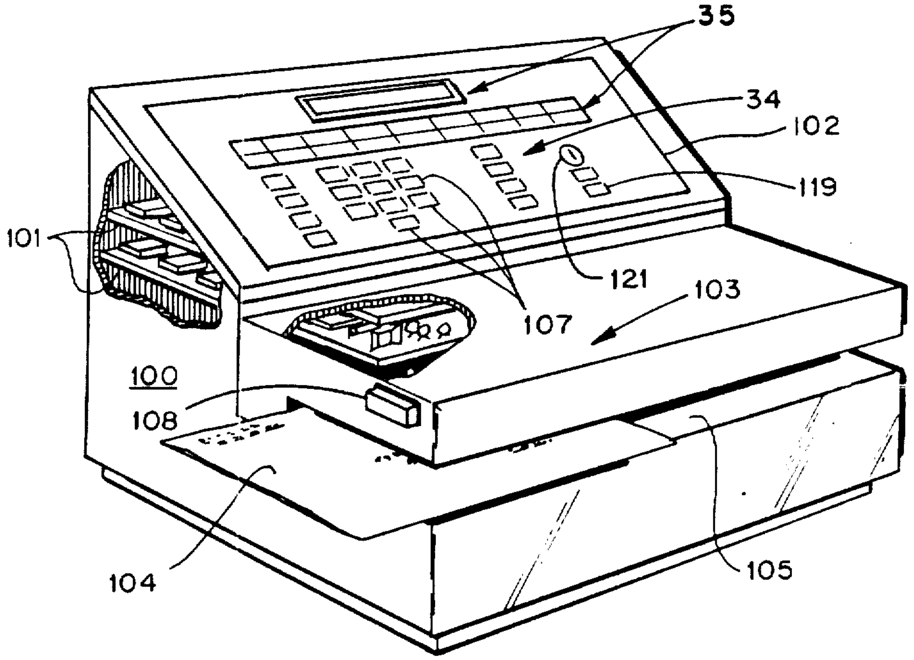
FIG. 3 is a perspective view of a general housing arrangement of the meter of FIG. 1.

Referring to FIG. 3, there is shown a general housing arrangement for the microcomputer postage meter. The housing arrangement comprises a housing 100 that contains a module plug-in circuit panels 101 containing circuitry in the CPUs, ROMs and RAMs and shift registers of the meter. The keyboard 34 and display 35 are mounted on the common top panel 102 of the housing 100. The setting and printing mechanism is contained in a forward section generally shown by the arrow 103. An envelope 104 which is to be printed from postage is introduced into the slotted portion 105 of the meter section 103 after the meter is initialized. The amount of postage to be printed is then keyed into the keyboard 34 via pushbuttons 107. The set button 119 is pushed to set the postage into the print drum and the print button 108 is depressed. The print button 108 may be replaced by limit switch or optical sensor located in slot 105 which would automatically provide a print signal when an envelope enters slot 105.

Figure 4:
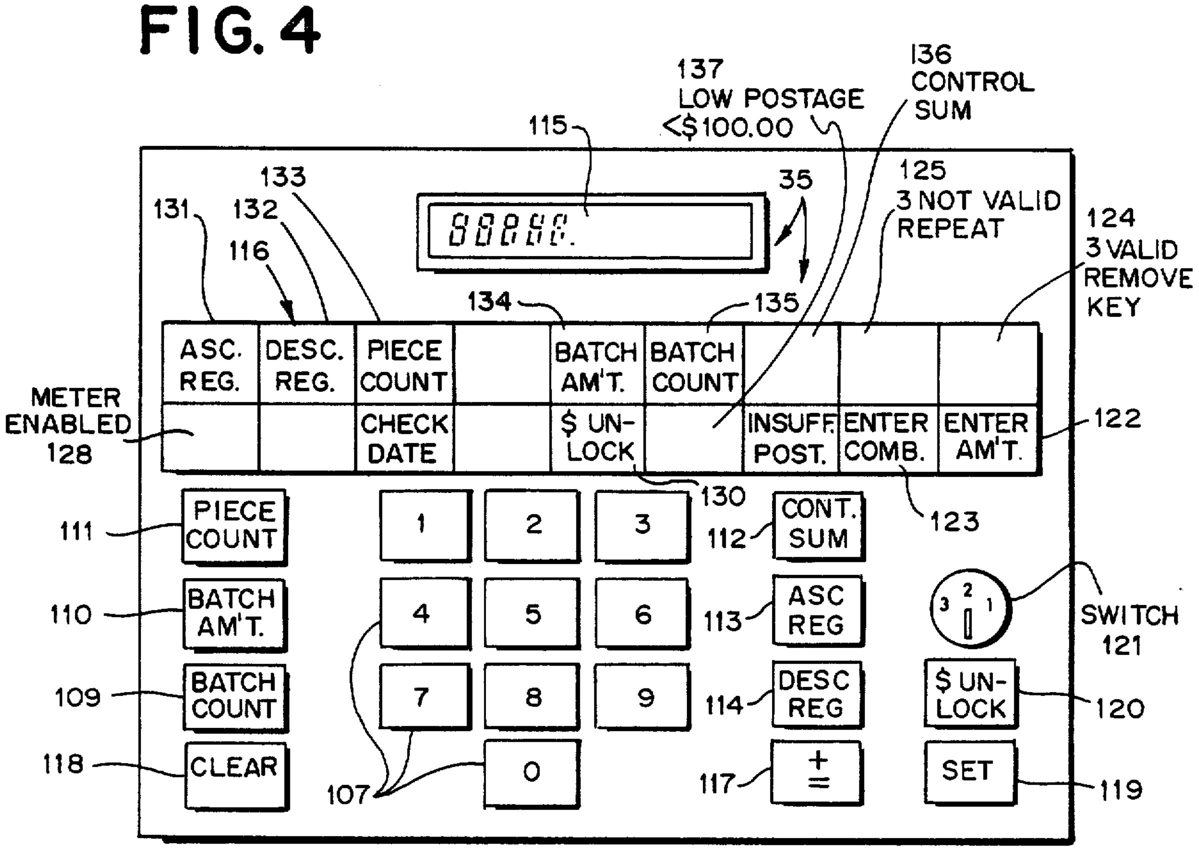
FIG. 4 is an enlarged plan view of the front panel of the postage meter.

FIG. 4 is an enlarged view of panel 102 of FIG. 2 which contains the keyboard 34 and display 35 of the postage meter. The keyboard 34 comprises pushbuttons 107 as aforementioned to enter the numerical amount of postage into the system. Pushbuttons 109, 110, 111, 112, 113 and 114 cause the numbers stored the electronic registers for batch count, batch amount, piece count, control sum, ascending register and descending register, respectively to be displayed. When any one of these buttons are depressed, the numerical section 115 of the display, is cleared, the appropriate register is loaded into the the numerical section 115, and the appropriate indicator lamp 131–136 in section 116 of the display is lighted. Lamp 128 is lit to indicate that the postage meter is ready for operation.

The keyboard 34 and display of this invention provide two new registers (more can be added without too much difficulty). Batch count and batch amount registers supply a running account of the total number of pieces of mail processed and total postage expended, respectively, during any one run or time period. They can be reset to zero by the user.

The control sum register is extremely useful in that it provides a check upon the descending and ascending registers. The control sum register has a running account of the total funds being added into the meter. The control sum register must always correspond with the summed readings of the ascending and descending registers. The control sum register is the total amount of postage ever put into the machine and it is alterable only when adding funds to the meter. Generally, mechanical meters are not resettable by the user but only by postal authority. It is also true for electronic postage meters that often times postal authorities want the meter to be only resettable by that authority. The piece count register differs from the batch count in that it is not resettable by the user and it is used to indicate the total number of postage printings the machine has experienced. This information is useful to ascertain the life of the machine and to gauge when the system may require servicing and maintenance.

The ascending and descending registers operate in a normal fashion that might be expected from a standard postage meter. The ascending register giving a running total of the printed postage and the descending register informing the operator of the amount of postage funds still remaining in the postage system. The key pushbutton 117 provides a function of addition for adding in special charges to the postage such as the special delivery, certification, etc. The clear key 118 clears the numeric display 115 and also sets the batch register to zero. If either one is displayed at the time, the clear key is actuated.

The set button 119 is depressed after the postage required to mail a letter is keyed in by buttons 107. The set button 119 causes the printing wheels in a printing drum (not shown) of the postage meter 100 to set the desired postage. The dollar unlock lamp 130 warns that postage over $1.00 has been keyed in. The dollar unlock key 120 is a precautionary button which may be depressed by the operator in order to set postage equal to or in excess of a dollar. This extra physical step acts to prevent costly postage printing mistakes. The need to add funds to the meter 100 is signaled by indicator lamp 137.

Funds are added to the meter 100 by obtaining a key that can be inserted in the key way of lock switch 121. The switch is now free to be turned to a first position and a indicator light 122 is lit. Light 122 instructs the operator to key in the funding amount into the keyboard 34 via pushbuttons 107. After the funding amount is entered, the switch 121 is turned to a second position. Light 123 instructs the operator to enter a combination.

A number sequence comprising an unlocking combination is then entered into the meter using pushbuttons 107.

The switch 121 is now turned to a third position. The turning of the switch to this third position will evoke one of the two responses from the system. If the combination is a valid one, then the indicator lamp 124 will light to inform the operator that the entered combination is a correct one. The key should be removed from the lock switch 121. If, on the other hand, however, the entered combination was incorrect, indicator lamp 125 will be lit to inform the operator of this fact and to instruct him to repeat the funding procedure.

It is desirable that the internal combination be changeable to further enhance the security of electronic postage meters. Often times, postal employees may leave the employment of the Post Office. Upon that occurrence, it may happen that the key that is used to unlock the key switch on the postage meter will be taken by that personnel. The Post Office will therefore want to change the combination of a postage meter when that employee leaves.

Therefore, it is important that there be a series of combinations generated within the postage meter whereby if one combination has been compromised then another combination can be substituted therefor. In fact, in a situation where initially a first combination is utilized, then if for some reason that combination is compromised, the second combination will be utilized and the initial combination will no longer be able to open the postage meter or to add additional funding to the postage meter.

Generally, these combinations can be either stored or generated in a variety of ways. Often times, tables of values are located within one of the memory locations (FIG. 2) of the postage meter to provide the proper combination. In this kind of scheme, the CPU 101 would thereupon "look up" the particular value. This type of procedure would require the use of large amounts of memory space to store the series of combinations. Thus, what is done in this invention is to store a small table of seed numbers in the memory location (probably NVM 204) which serves to differentiate one meter from another and to generate the combinations utilizing a subroutine which is the same from meter to meter and resides in the less expensive permanent memory.

The operation of multiplication is commonly used in subroutines which produce a series of random digits from a given seed. However, since no code to perform multiplication exists in the meter, a method of random digit generation based on an existing cyclic redundancy code (CRC) generator was created. There are a variety of CRC schemes that can be implemented to provide the numbers. CRC schemes are well known. The enhanced security is provided by the present invention by not utilizing CRC schemes exclusively to generate the combinations. Thus, it is appropriate to utilize an existing CRC generating scheme as a randomizing means in conjunction with additional coding to generate the combination of numbers in such a way that someone familiar with the CRC coding would not readily break it.

In this invention, Applicant provides such a coding scheme to enhance the security of the postage meter. This improvement will be described by referring to FIGS. 5 through 8 in association with the following discussion. At the outset it should be noted that although this invention is described in terms of a particular method of CRC generation in conjunction with particular additional code, it is done for illustrative purposes only. Thus, this invention could be utilized with other methods of number generation and similar forms of the additional code and those teachings would still be within the spirit and scope of the invention.

Figure 5:
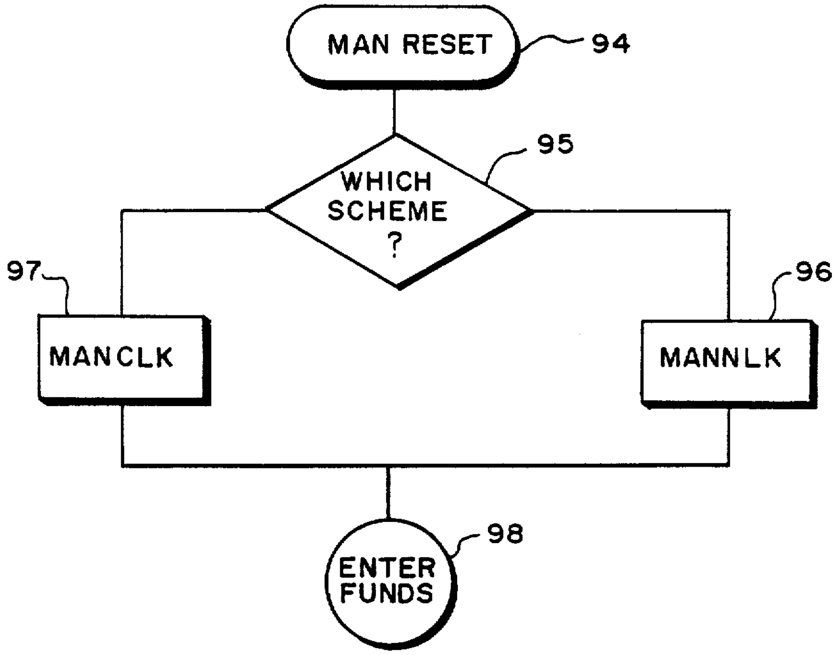
FIG. 5 is a generalized flow chart of a routine for generating a series of combinations to be used in conjunction with postage meters similar to that of FIGS. 1 and 2.

In accordance with the embodiment of the invention, the flow chart of FIG. 5 shows in generalized form a routine for manually resetting the postage meter indicated by MAN RESET 94. As shown in the figure, a decision box 95 indicates whether a combination is necessary to open the meter or not. If a combination is not necessary and only a key is required to open the meter for funding then the routine MANNLK 96 (manual no lock) is implemented which will allow a key to open the mechanical lock manually. If the decision box 95 indicates that a combination is necessary to open the meter then the routine MANCLK 97 (manual combination lock) is entered. This routine initiates the scheme of generating the combination. As is seen in the figure, after either the MANCLK 96 or MANNLK 97 is processed without error, then postage funds have been entered into the meter.

By way of explanation, certain terms will be defined to add clarity to the foregoing description. A value as described in this application is a binary number containing any number of bits. A digit as described in this application is a 4 bit binary value variously interpreted to include hexadecimal values Ø through F, binary coded decimal (BCD) values Ø through 9, and octal values Ø through 7. A single combination is a group of digits. That group can be of any digit length. A table as will be hereinbelow described is a collection of a certain number of digits in which a single combination can be derived or a plurality of combinations can be derived. The number of digits in a combination can be specified by the non-volatile memory located within the electronic postage meter.

Figure 6:
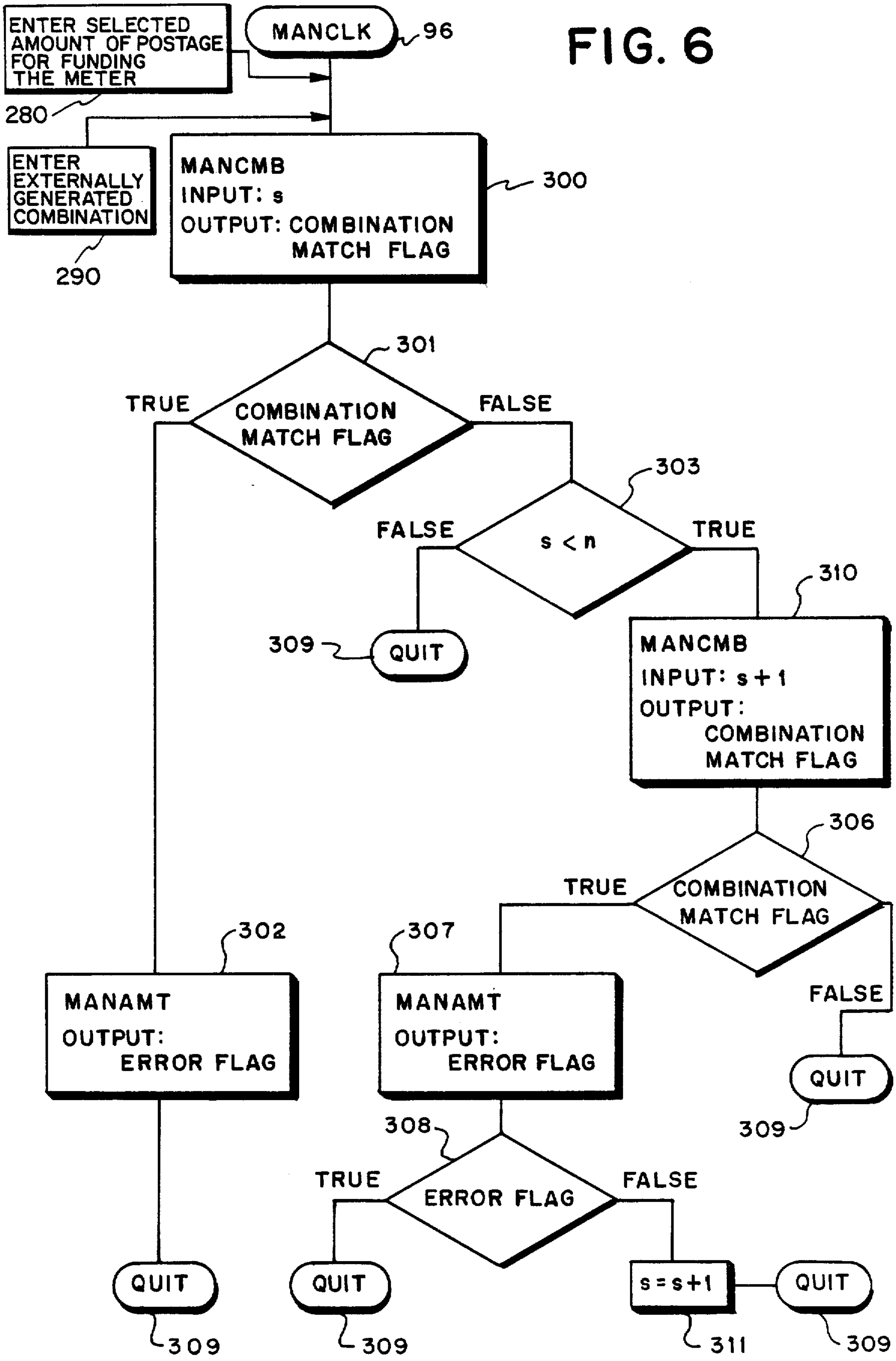
FIG. 6 is a flow chart of a subroutine MANCLK which is associated with the generalized flow chart of FIG. 5.

FIG. 6 shows the routine MANCLK in more detail. The object of this routine is to generate a finite number of combinations containing a specifiable number of digits. The number of digits is specified by a value located in the non-volatile memory. If the locking device is in a state S where S is the sequence number of the current primary combination greater than zero but less than N, N being the sequence number of the last combination in the finite series of combinations, then the locking device is responsive to the $(S)^{th}$ combination and the $(S+1)^{th}$ combination. If S equals N, then the device is responsive to only the $N^{th}$ combination. This is one variety of the hotel lock scheme referred to in the figure. MANCMB, box 300, generates the $(S)^{th}$ combination which is outputted to a decision box 301. The decision box determines whether the externally entered combination value block 290, matches the combination that is to be used to enter funds into the meter.

If the combinations do match, then program execution follows the true leg down to MANAMT, 302. The externally entered amount from block 280 is then added to the descending register if the amount is within suitable limits and the routine is exited at box 309. If the flag is false from decision box 301, then another decision box 303 is entered. That decision box 303 tests the relationship between S and N to determine whether there is a secondary combination. If S=N, then there is no secondary combination and the routine is exited at box 309. If there is a secondary combination, MANCMB 310 is executed again to calculate $(S+1)^{th}$ combination. This combination is then compared with the externally entered combination at decision box 306. The decision box 306 if false will cause the routine to quit. If the flag is true, however, then MANAMT 307 is entered. If the externally entered amount is within suitable limits, then the money is added to the descending register. The error flag output by MANAMT will be true if the entered amount could not be added to the descending register. The flag is tested in decision box 308. If the amount was successfully added to the descending register then at 311 the $(S+1)^{th}$ combination becomes the $(S)^{th}$ or primary combination. In any event, the routine quits box 309.

The above discussion describes how the hotel lock routine is utilized to proceed from one combination to the next in this embodiment. Thus, as can be seen from FIG. 6, there is a possibility that MANCMB will be executed twice to determine whether a combination is the primary combination or the secondary combination.

FIG. 7 shows the routine MANCMB in more detail. The object of MANCMB is to generate one of a finite number of different combinations which is a function of the sequence number of the combination, the number of digits in the combination and the seed number table stored in the particular postage meter. Seed numbers are utilized in microcomputerized postage meters and are also utilized in random number generation schemes associated therewith. Typically, each postage meter will have its own set of seed numbers. In this routine as shown in FIG. 7, another routine called MANALG 401 s executed under instruction that the seed numbers are to be used as the generating table to produce an intermediate combination. This combination can be of any digit length and in this case the intermediate combination is the same size as the seed table. Thereafter, MANALG is called again (box 403) under instruction that the intermediate combination is to be used as the generating table to produce a second combination. This is the combination that will open the postage meter. After the second combination is produced, the routine is exited at 405.

Referring to FIG. 8, the routine MANALG is shown in more detail. MANALG generates a more or less random sequence of a specifiable number of digits as a function of a sequence number, the specified number of digits and a specifiable table of values. The routine MANALG can be adapted to an existing coding scheme to produce the sequence of digits. In this embodiment, a CRC scheme is used by the routine to produce the random sequence of digits. Those skilled in the art recognize other coding schemes can be utilized and still be within the spirit and scope of the invention.

The MANALG routine also insures that the first digit of the random sequence is odd or even as the value of the sequence number of the combination is odd or even. Thus, providing that succeeding combinations are not identical. Once again, however, it is clear that the combinations can be varied in another way such as changing the last digit in variance with sequence number, and still be within the spirit and scope of the invention.

Referring again to FIG. 8, Box 500 shows the initializing step for the different functions of the combinations. In this embodiment, the sequence number and the number of digits of the combination are already defined. In an initializing procedure indicated by Box 501 CRCVAL is set to some value. Then the sequence number is accumulated into the CRCVAL by the statement as shown in Box 502. CRCNIB is a function that will take the sequence number and accumulate it in a special way into the value of CRCVAL. CRCNIB contains a well known algorithm which is utilized extensively by those skilled in the art.

The statement IN=0, Box 503 indicates the input subscript to indicate which digit of the table is being referenced. For example, in this embodiment, each digit is 4 bits in length. Thus, for each digit, the subscript value of IN would correspond to each set of 4 bits in a sequential manner. Box 504, sets the number of digits that will be produced in the combination. Thus, the digit counter (DGTCTR) can be, for example, between 1 and 16 digits as defined thereby by the constant (DGTCNT) which is established when the meter is manufactured. Finally, OUT=0, Box 505 is another subscript that indicates which digit of the combination is being calculated.

The outer loop 520 of the flow chart of FIG. 8 will be repeated for each digit of the combination as will be hereinafter described. The inner loop 521 is repeated a variable number of times dependent upon the value of LOPCTR, a loop counter, whose value depends on intermediate values of the developing CRC.

Initially, LOPCTR, 507, is equal to the CRCVAL with an operation performed on the CRCVAL number. For example, the CRCVAL can be "anded" with a hex value to produce a number. This number controls the number of times that box 512 is executed. Box 509 provides for producing an input subscript which is a function of CRCVAL, the previous value of IN and another operation performed on the number. As before mentioned, IN is initially 0 (Box 503). As can be seen, this operation causes IN to be varying in a non-sequential manner as a function of other varying values (CRCVAL and the operations). Thereafter, in Box 510, a new CRCVAL is produced by use of the CRCNIB routine in conjunction with a digit from whatever table is specified. The table can be of 64 bits or some other finite number. Then, the loop counter is decremented as indicated by Box 511. For each digit, loop 521 will be repeated some variable number of times until the value of loop counter is less than zero.

As shown by decision Box 513, if the loop counter, LOPCTR, is greater than or equal to zero then, the above-mentioned operations are repeated. If however the loop counter, Box 511, is less than zero, then the digit of the combination is calculated by Box 514.

Box 515 indicates the incrementing of the output subscript. If there are more digits to be calculated; that is, if DGTCTR is greater or equal to 1 then looping back to 506 via 520 continues with the production of the next digit. If the combination has the requisite number of digits represented by DGTCTR less than 1 then, in box 519, the first digit of the combination is made odd or even as the sequence number of the combination is odd or even, and a combination has been generated to allow funding to the postage meter. Thus, as can be seen from this arrangement, the combination can be of any length dependent upon the value initially within DGTCNT.

Thus, by calling the MANALG routine of FIG. 7 twice by the use of the MANCOMB routine of FIG. 6, a random sequence of numbers are generated to produce a set of combinations. The combinations are generated utilizing a seed table stored in the meter and generating those combinations from the table. Thus, the combinations are not actually stored in the meter but are generated on a "as needed" basis. This allows for a savings in memory capacity thereby allowing for that unused memory space to be utilized more efficiently in storing other critical information.

Thus, by the use of the two routines, MANCMB and MANALG, a combination is produced from a table of seed numbers. The routines therefore provide a means of generating a combination from a finite set of numbers rather than storing a table of combinations within the memory locations of the postage meter. Also, the use of the routines allow for combinations of numbers to be of varying lengths to be generated from these tables.

This is important because memory space, especially the non-volatile memory of the postage meter, is very valuable because of limited memory space for particular priced memories suitable for use in mass produced postage meters. Thus, when it is possible to utilize less of the space, as is the case here, there is room to add other critical information to the NVM and therefor more efficiently use the memory capacity.

The above-described embodiments can be modified in a variety of ways and those modifications would still be within the spirit and scope of Applicant's invention. Thus, while this invention has been disclosed by means of specific illustrative embodiments, the principles thereof are capable of a wide range of modification by those skilled in the art within the scope of the following claims.

What is claimed is:

1. A postage meter comprising:

means for entering a selected amount of postage into the postage meter in preparation for funding the meter with the postage amount, means for internally generating a set of unique combinations to allow funding the meter, the internally generating means having a table of seed numbers, the internally generating means further comprising:

means for producing an intermediate combination from the table of seed numbers, and means for producing the set of unique combinations in response to the intermediate combination producing means, means for entering an externally generated combination into the postage meter, means for comparing a plurality of the unique combinations of the set of internally generated combinations with the externally entered combination, and means for funding the postage meter with the selected postage amount when the comparison indicates the existence of a predetermined relationship between the plurality of the unique combinations of the set of internally generated combinations and the externally generated combination.

2. The postage meter of claim 1 in which the intermediate combination producing means and unique combination producing means each comprises means for encoding a digit into a value and means responsive to the encoding means for combining multiple encoded values into a sequence of a specifiable number of digits.

3. The postage meter of claim 2 wherein the intermediate combination producing means and the unique combination producing means each further comprises:

means for performing a predetermined operation on the values produced by the encoding means, and means for controlling the number of times the performing means is activated, the controlling means activating said performing means said number of times as a function of a sequence number of a table of values and a value specifying the number of digits in the combination.

4. The postage meter of claim 2 in which the encoding means uses a cyclical redundancy code for encoding the digit.

5. The postage meter of claim 1 wherein said means for comparing compares two unique combinations with the externally entered combination, the postage meter including means for replacing an unselected one of the two unique combinations with another unique combination for use in a next comparison when the comparison indicates the presence of the predetermined relationship between a selected one of the two unique combinations and the externally generated combination.

6. A method for funding a postage meter comprising the steps of:

entering a selected amount of postage into the postage meter in preparation for funding the meter with the postage amount;

generating within the postage meter an intermediate combination utilizing a table of seed numbers;

producing a set of unique postage meter combinations in response to the generation of said intermediate combinations;

entering an externally generated combination into the postage meter;

comparing the externally generated combination with a plurality of the unique combinations of the set of postage meter combinations, and funding the postage meter with the selected postage amount when the comparison indicates the existence of a predetermined relationship between the externally generated combination and the plurality of unique combinations of the set of postage meter combinations.

7. The method of claim 6 wherein two unique combinations are compared with the externally generated combination, and when the comparison indicates the presence of the predetermined relationship between a selected one of the two unique combinations, the unselected combination of the two unique combinations is replaced with another unique combination for use in a next comparison.

* * * * *